United States Patent
Clifford et al.

(10) Patent No.: US 9,589,019 B2
(45) Date of Patent: Mar. 7, 2017

(54) PERFORMANCE ANALYSIS OF A DATABASE

(71) Applicant: International Business Machines Corporation, Armonk, NY (US)

(72) Inventors: Austin Clifford, Dublin (IE); Konrad Emanowicz, Dublin (IE); Enda McCallig, Robertstown (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 558 days.

(21) Appl. No.: 13/887,718

(22) Filed: May 6, 2013

(65) Prior Publication Data
US 2013/0311446 A1 Nov. 21, 2013

(30) Foreign Application Priority Data
May 16, 2012 (GB) .................................. 1208584.1

(51) Int. Cl.
*G06F 7/00* (2006.01)
*G06F 17/30* (2006.01)
*G06F 11/34* (2006.01)

(52) U.S. Cl.
CPC .... *G06F 17/30469* (2013.01); *G06F 11/3409* (2013.01); *G06F 11/3447* (2013.01); *G06F 17/30294* (2013.01); *G06F 2201/80* (2013.01)

(58) Field of Classification Search
CPC .......... G06F 11/3447; G06F 17/30306; G06F 11/3457; G06F 11/3461; G06F 17/30442; G06F 17/30463; G06F 17/30474; G06F 17/30536
USPC ................................................... 707/688, 713
See application file for complete search history.

(56) References Cited

U.S. PATENT DOCUMENTS

| | | | | |
|---|---|---|---|---|
| 5,878,426 A | * | 3/1999 | Plasek | G06F 17/30489 |
| 5,960,428 A | * | 9/1999 | Lindsay | G06F 17/30466 |
| 5,978,789 A | * | 11/1999 | Griffin et al. | |
| 6,223,171 B1 | | 4/2001 | Chaudhuri et al. | |

(Continued)

OTHER PUBLICATIONS

Balmin et al., Proceedings of the 26th VLDB Conference, Cairo, Egypt, 2000, pp. 220-231.*

(Continued)

*Primary Examiner* — Cheyne D Ly
(74) *Attorney, Agent, or Firm* — Cantor Colburn LLP (57) ABSTRACT

A method and system are provided for performance analysis of a database. The method includes receiving a proposed data model, generating a hypothetical query workload using a plurality of sample query templates representing different query constructs for the proposed data model, generating hypothetical optimizer statistics using predefined generating rules that include a projected cardinality for the proposed data model and creating a sample empty database and database schema using the proposed data model. The method also includes applying the hypothetical optimizer statistics to the sample empty database, based on generating the hypothetical optimizer statistics, applying each query construct of the hypothetical query workload to the database schema and estimating a cost of the hypothetical query workload for the proposed data model.

18 Claims, 9 Drawing Sheets

(56) References Cited

U.S. PATENT DOCUMENTS

| | | | |
|---|---|---|---|
| 7,076,474 B2* | 7/2006 | Jin | G06Q 10/06 706/12 |
| 7,139,749 B2 | 11/2006 | Bossman et al. | |
| 7,343,369 B2* | 3/2008 | Faunce et al. | |
| 7,840,555 B2* | 11/2010 | Burger | G06F 17/30336 707/715 |
| 7,966,313 B2 | 6/2011 | Bruno et al. | |
| 2005/0267877 A1 | 12/2005 | Chaudhuri et al. | |
| 2006/0085378 A1 | 4/2006 | Raizman et al. | |
| 2006/0195416 A1* | 8/2006 | Ewen et al. | 707/2 |
| 2007/0061289 A1 | 3/2007 | Brown et al. | |
| 2007/0083502 A1 | 4/2007 | Ramakrishnan | |
| 2007/0174346 A1 | 7/2007 | Brown et al. | |
| 2007/0239744 A1 | 10/2007 | Bruno et al. | |
| 2008/0114801 A1* | 5/2008 | Singh | G06F 17/30306 |
| 2008/0195577 A1* | 8/2008 | Fan | G06F 17/30469 |
| 2009/0327254 A1* | 12/2009 | Bruno | G06F 17/30312 |
| 2011/0137890 A1* | 6/2011 | Bestgen | G06F 17/30466 707/719 |
| 2011/0320403 A1* | 12/2011 | O'Krafka et al. | 707/620 |

OTHER PUBLICATIONS

Dodge et al., Essential Oracle8i Data Warehousing, Wiley, p. 209, 2000.*

S. Agrawal, et al., "AutoAdmin: Self-Tuning Database Systems Technology," Copyright 2006 IEEE; pp. 1-9.

Internet Retrieval: "Exploratory Analysis Using Database Engine Tuning Advisor," retrieved from http://rrisdn.microsoft.com/en-us/library/ms1892921; dated: Sep. 14, 2012; pp. 1-4.

G. Papastefanatos, et al., "Hecataeus: A What-If Analysis Tool for Database Schema Evolution," Software Maintenance and Reengineering, 2008. CSMR 2008., 12th European Conference on Issue Date: Apr. 1-4, 2008; pp. 1-3.

* cited by examiner

PERFORMANCE ANALYSIS OF A DATABASE

PRIORITY

The present application claims priority to Great Britain Patent Application No.: 1208584.1, filed May 16, 2012, and all the benefits accruing therefrom under 35 U.S.C. §119, the contents of which are incorporated by reference herein in its entirety.

BACKGROUND

This invention relates to the field of performance analysis of a database. In particular, the invention relates to cost-based performance analysis of a database.

During the design of a new database, the designer will create a logical data model and then from this a physical data model of the proposed database. The physical data model includes a representation of the physical embodiment of the proposed database and will include physical attributes and features such as database partitioning feature (DPF), distribution keys, range partitioning, multidimensional clustering, materialized query tables, etc. The designer will generally utilize a data modelling tool for this exercise. Data modelling tools facilitate the generation of data definition language (DDL) from a physical model created using the tool. However, these tools currently do not offer a facility to test or validate the performance characteristics of the DDL generated.

SUMMARY

A method and system are provided for performance analysis of a database. The method includes receiving a proposed data model, generating a hypothetical query workload using a plurality of sample query templates representing different query constructs for the proposed data model, generating hypothetical optimizer statistics using predefined generating rules that include a projected cardinality for the proposed data model and creating a sample empty database and database schema using the proposed data model. The method also includes applying the hypothetical optimizer statistics to the sample empty database, based on generating the hypothetical optimizer statistics, applying each query construct of the hypothetical query workload to the database schema and estimating a cost of the hypothetical query workload for the proposed data model.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Exemplary embodiments of the present invention will now be described, by way of example only, with reference to the following drawings in which.

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

There are existing tools for suggesting design changes to a database to optimize performance. These tools typically require a predefined workload (a set of SELECT statements which run on the target database) as well as a fully populated database. Unfortunately, when setting out to design a new system, the designer will generally have neither a workload nor a populated database.

This is something database designers struggle with, and often important physical design decisions on a new system are based on best practice or expert advice (i.e., based on a qualitative rather than a quantitative assessment). Furthermore, the designer also needs to design the solution to meet future growth forecasts and ensure the system performance is scalable.

The main drawback of known solutions is that they require a populated database with an existing set of optimizer statistics and a structured query language (SQL) workload in order to evaluate the cost impact of design changes to the schema. Many important physical design decisions are made up front by the database designer before the database is created and populated. The effort and associated cost of correcting design flaws increases significantly the later the corrections are made in the project life cycle.

This problem is particularly acute at the large scale associated with data warehousing.

The described method and system provide performance analysis of a database by providing a facility to generate a hypothetical query workload together with a hypothetical set of optimizer statistics. This may be applied to a sample empty database created using the designed data definition language (DDL), and the overall cost of this workload for the proposed configuration may be estimated. The database to be analysed may be a new database or a modification of an existing database. A new database by its nature does not have any real statistics available and therefore the proposed solution addresses this problem. In the case of a modification of an existing database, the proposed solution may overcome the problem of available real statistics being misleading or inappropriate in the modified version.

The designer applies an iterative process by making "what-if" changes to the physical data model and using the proposed facility to quantify the likely impact on the performance of the workload. Ideally, this facility should be portable and applicable to the various commercial database management system (DBMS) products. Finally, this facility will ideally not require the target database infrastructure (which may not yet be in place) and will be possible to run and produce accurate results from the designer's laptop/desktop via a simple graphical user interface (GUI).

It is possible to generate an estimated cost for a workload query (SELECT) using DBMS optimizer explain plan functionality. Database software, such as DB2 (a trademark of International Business Machines Corp.), Oracle (Oracle is a trademark of Oracle Inc.), SQL Server (a trademark of Microsoft Corporation) and Sybase (Sybase is a trademark of Sybase Inc.), can estimate a cost for the query using optimizer statistics. It is not necessary to have "real" data in the user tables referenced by the workload queries. These statistics (table level cardinality, column cardinality, data pages, index cardinality, index levels) can be manually set/manipulated by the user.

DB2 allows the user to set these statistics by updating the system catalog tables. Similarly, optimizer statistics can be manipulated in Oracle via the package DBMS_STATS, in Sybase using the optdiag utility, and in MS SQL Server using the UPDATE STATISTICS command.

In DB2 for example, these relevant optimizer statistics can be set by updating the system catalog:

On syscat.tables SET card, fpages, npages;
On syscat.columns SET high2key, low2key, colcard;
On syscat.index SET nleaf, nlevels, clusterratio, sequential_pages and density.

While the designer may not know precise cardinality information for the proposed database, they will have at least have a good sense of the likely relative proportions between the various table entities and the selectivity of each dimension property at various scale points in the lifetime of the system. Thus, a facility may be included in the data modelling tool to allow the designer to supply the projected cardinality for each table and its associated columns.

Manually setting these statistics is an onerous process, as there are typically complex validation rules governing the range of permitted values for these statistics. However, the described method uses a combination of mathematical and some heuristic rules to set the required statistics based only on the table and column cardinality supplied by the designer. The calculations involved are described further below. Based on this approach, a hypothetical set of optimizer statistics may be derived and set in the database catalog. The next requirement is to derive a hypothetical workload.

In the embodiment of modern data warehouse systems, queries typically involve the aggregation of the results of one or more dimension tables joined to a fact table. These ROLAP (relational online analytical processing) queries allow the end-user to interrogate the Fact table and its associated dimensions as a cube of data. Queries are typically either projections (subset of dimension properties and fact measures), roll-up (aggregation of fact measures), drill-down (opposite of rollup, typically removing a given dimension), or slice (filter based on dimensions not in row or column edges).

The database design may include the definition of foreign key (FK) constraints between the tables. These constraints can be used to identify the Fact tables and their associated dimensions. Once the Fact and Dimension tables have been identified, a sample set of typical ROLAP queries can be constructed from a set of template queries and the foreign key constraints for each fact-dimension cluster. The queries constructed will represent each of the usual ROLAP (projections, roll-up, drill-down etc.) constructs and could also include more sophisticated constructs such as nested grouping/aggregations, common table expressions. The templates would include substitution markers for dimension properties, fact measures, join and local predicates.

If the designer does not specify a workload, a sample hypothetical workload can be constructed based on the query templates. Join predicates may be substituted based on FK constraints. Dimension properties and fact measures may be randomly selected from the table definitions. Local predicates may be randomly selected from the dimension tables for slice and filter conditions and literal values are randomly substituted based on the data-type of the associated dimension column.

Next, the designer may use the facility already existing in most data modelling tools, including IBM Data Architect, to generate and apply the DDL to a sample database. Once the DDL has been applied to create the database schema, the calculated table, column and index cardinalities may then be applied by updating the relevant optimizer statistics values in the system catalogue.

Once the hypothetical optimizer statistics are set, each query from the hypothetical workload generated may be executed against the database using an explain plan command to compute an access path used and associated estimated cost.

The estimated cost in the explain plan output of all the workload queries may then be summed which represents a base line cost and this may be communicated back to the designer. This estimated cost may be in the unit of timeron (notional unit of machine dependent processing time). While this is not the same as actual real time duration it is accurate as a relative measure. Thus, the design with the lowest overall cost will be the best performing design under real data volumes and actual physical implementation.

The designer may then try other what-if alterations to the schema design (e.g. add index, materialized query table) and resubmit the hypothetical workload to test the impact to the overall cost and iteratively refine the physical schema design. Additionally, the designer may adjust the cardinality information to project future performance of the schema design as the database scales up.

Figure 1:
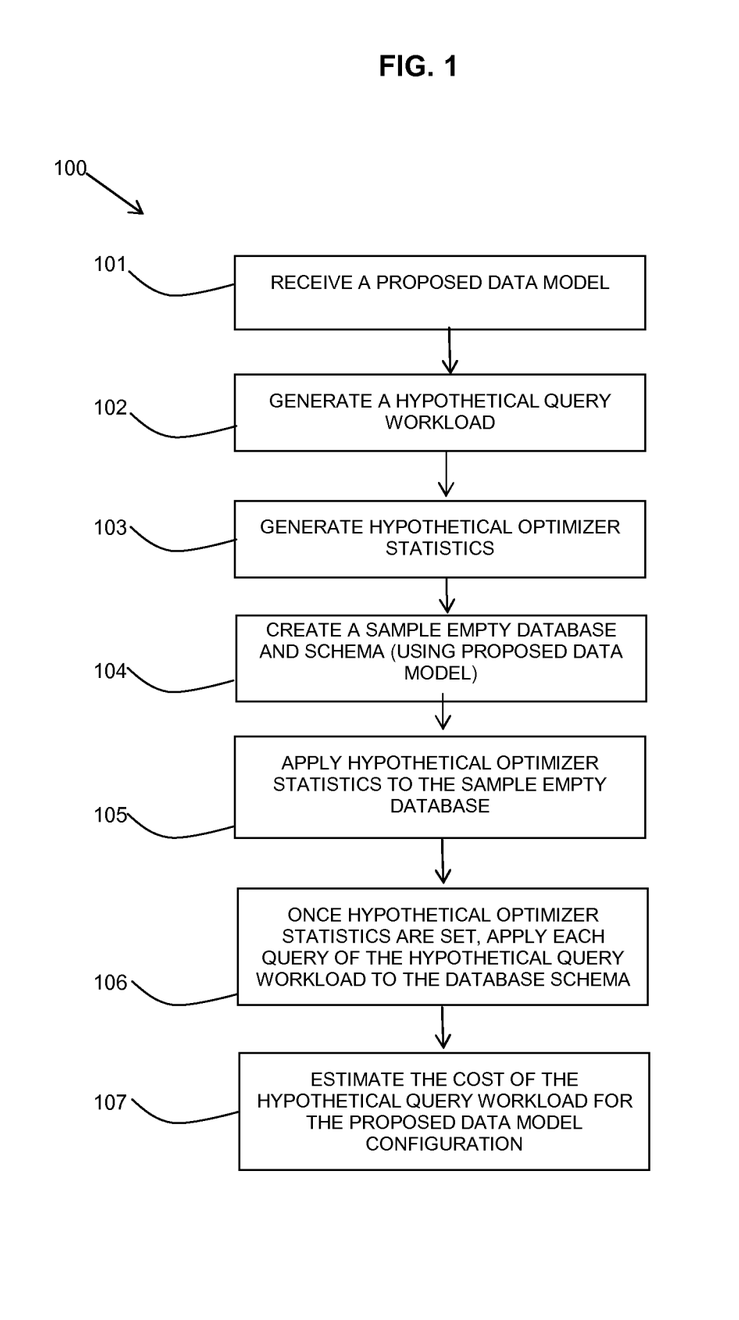
FIG. 1 is a flow diagram of an embodiment of a method in accordance with an exemplary embodiment of the present invention.

Referring to FIG. 1, a flow diagram 100 shows an embodiment of the described method. A proposed data model is provided in block 101. A hypothetical query workload is generated in block 102. Hypothetical optimizer statistics are generated in block 103. A sample empty database and schema are created in \block 104 using the proposed data model. The hypothetical optimizer statistics are applied 105 to the sample empty database. Once the hypothetical optimizer statistics are set, each query of the hypothetical query workload may be applied in block 106 to the database schema. The cost of the hypothetical query workload may be estimated in block 107 for the proposed data model configuration.

The method may also include applying an iterative process by making "what-if" changes to the underlying physical data model and using the proposed facility to quantify the likely impact on the performance of the workload.

Figure 2:
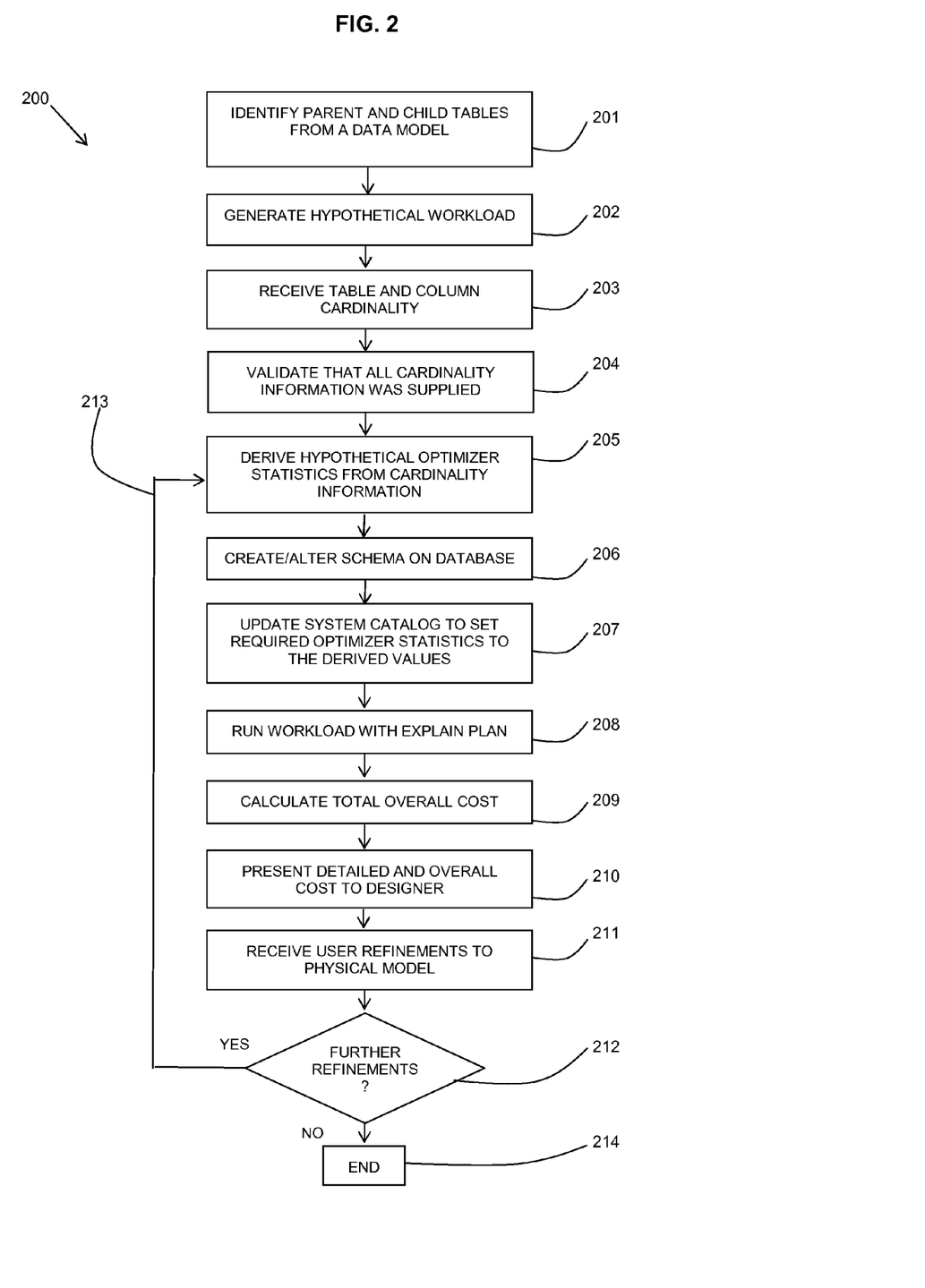
FIG. 2 is a flow diagram of an embodiment of a method in accordance with the an exemplary embodiment of the present invention.

Referring to FIG. 2, a flow diagram 200 shows a more detailed embodiment of the described method.

Child tables and parent tables may be identified in block 201 from a data model (in the case of a data warehouse, fact tables and their associated dimensions may be identified). A hypothetical workload may be generated in block 202, such as a hypothetical ROLAP workload using FK constraints. Table and column cardinality may be received in block 203 from the database designer. It may be validated in block 204 that all the required cardinality information has been supplied.

Hypothetical optimizer statistics may be derived in block 205 from the supplied cardinality information. A schema of the database may be created or altered in block 206, for example, a DDL may be created and run on a target database instance. The system catalogue may be updated in block 207 to set to the required optimizer statistics to the derived values.

The workload may be run in block 208 with an explain plan feature and the total overall cost calculated in block 209. Detailed and overall cost analysis may be presented in block 210 to the designer.

The designer may refine the physical model and the method receives in block 211 the model refinements, for example, to introduce index, materialized query tables etc. and resubmit the hypothetical workload for further cost impact analysis. This may be done iteratively by determining in block 212 if there are further refinements and, if so, looping 213 to calculate the hypothetical optimizer statistics. If there are no further refinements, the method ends in block 214.

Figure 3:
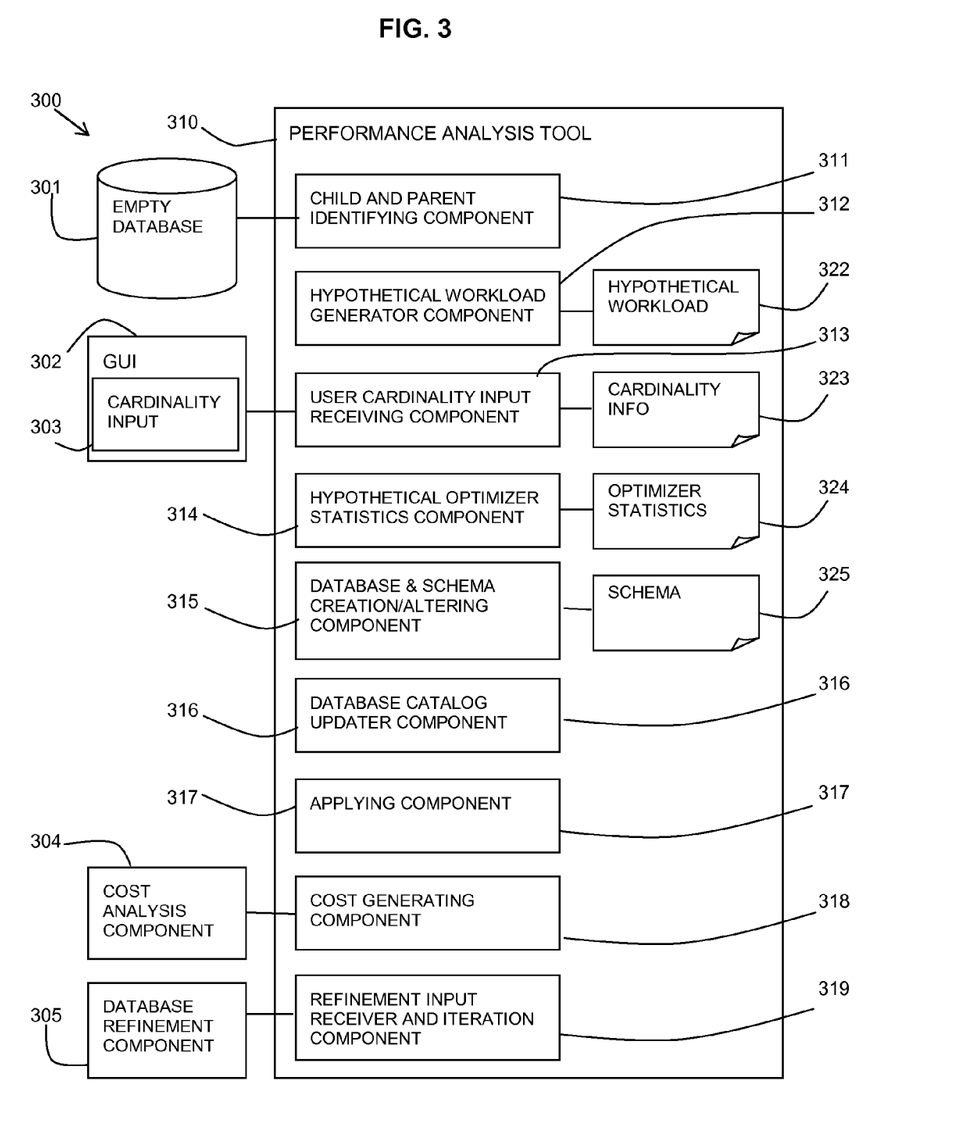
FIG. 3 is a block diagram of an embodiment of a system in accordance with an exemplary embodiment of the present invention.

Referring to FIG. 3, a block diagram shows an embodiment of the described system 300. The system 300 includes a performance analysis tool 310 for cost-based performance analysis of a database. A sample empty database 301 is provided which may be created with a database schema using a designed DDL for a proposed data model.

The performance analysis tool 310 may include a child and parent identifying component 311 for identifying child and parent tables (fact tables and their dimensions in a data warehouse context) from the database 301. A hypothetical workload generator component 312 may be provided for generating a hypothetical workload 322.

The performance analysis tool 310 may include a graphical user interface 302 for user cardinality input 303 which may be received at a user cardinality input receiving component 313 and stored as cardinality information 323.

The performance analysis tool 310 may include a hypothetical optimizer statistics component 314 for deriving hypothetical optimizer statistics 324 from the cardinality information 323. A database and schema creation/altering component 315 may be provided to create or alter a schema 325 on the sample empty database. A database catalogue updater component 316 may be provided for updating the system catalogue to set to the required optimizer statistics 324.

An applying component 317, such as an explain plan component may be provided which may be run and a cost generating component 318 may generate the overall cost which may be presented in a cost analysis component 304 to the designer. A database refinement component 305 may be provided for the designer to input refinements and a refinement input receiver and iteration component 319 may apply the refinements and reiterate the cost analysis.

The performance analysis tool 310 may be provided within a typical data-modelling tool so that physical design decisions may be made upfront at an initial database design stage.

Figure 4:
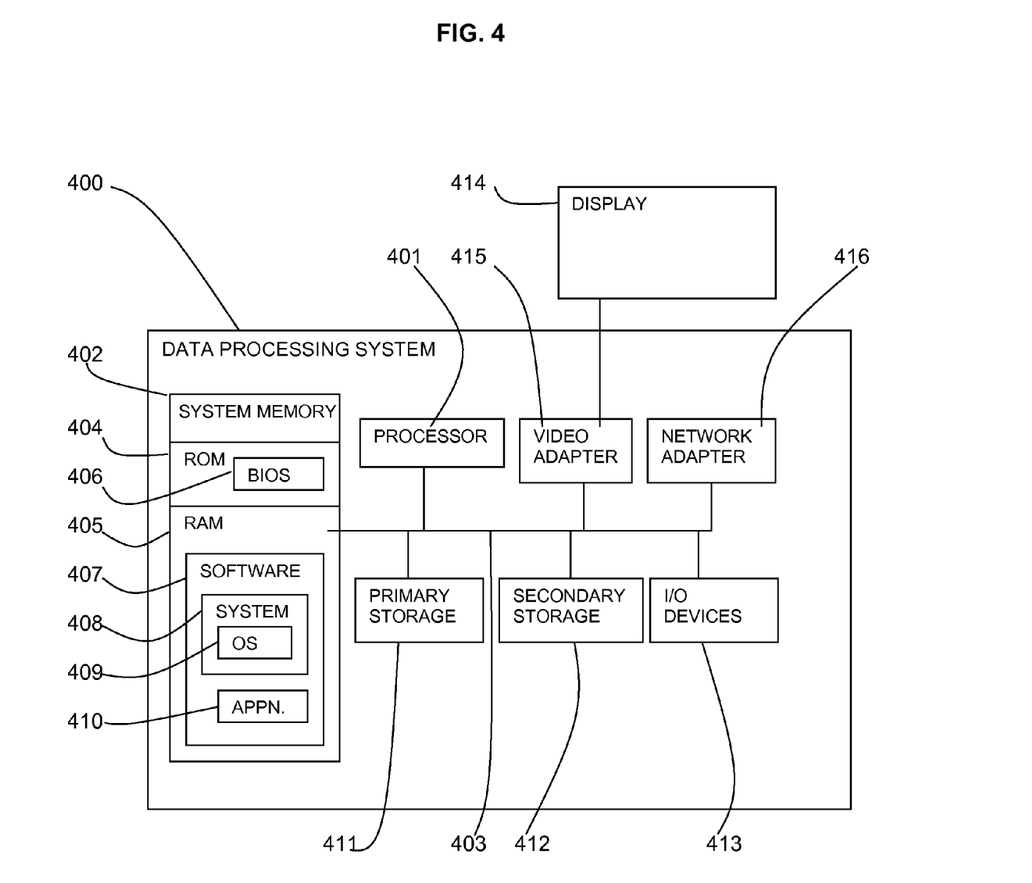
FIG. 4 is a block diagram of a computer system in which an exemplary embodiment of the present invention may be implemented.

Referring to FIG. 4, an exemplary system for implementing aspects of the invention includes a data processing system 400 suitable for storing and/or executing program code including at least one processor 401 coupled directly or indirectly to memory elements through a bus system 403. The memory elements can include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. System software 407 may be stored in RAM 405 including operating system software 408. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402.

The computing system 400 may operate in a networked environment using logical connections to one or more remote computers via a network adapter 416.

Input/output (I/O) devices 413 can be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

The steps described in relation to FIGS. 1 and 2 above, are now described in further detail.

Generate Hypothetical Workload

The data mode includes the definition of foreign keys. Foreign keys constrain the data in referenced tables such that every row in the child table must have a row in the parent table.

In a data warehouse environment fact tables typically have several parent dimension tables. Dimension tables will typically have one or more child fact tables. A workload may be generated by identifying fact and dimension tables and then applying a query template to these.

In a general (non data warehouse) environment parent tables may also be child tables and therefore the notion of fact and dimension tables may not apply. In this case parent/child relationships can be applied to the query template to generate the workload.

Figure 5:
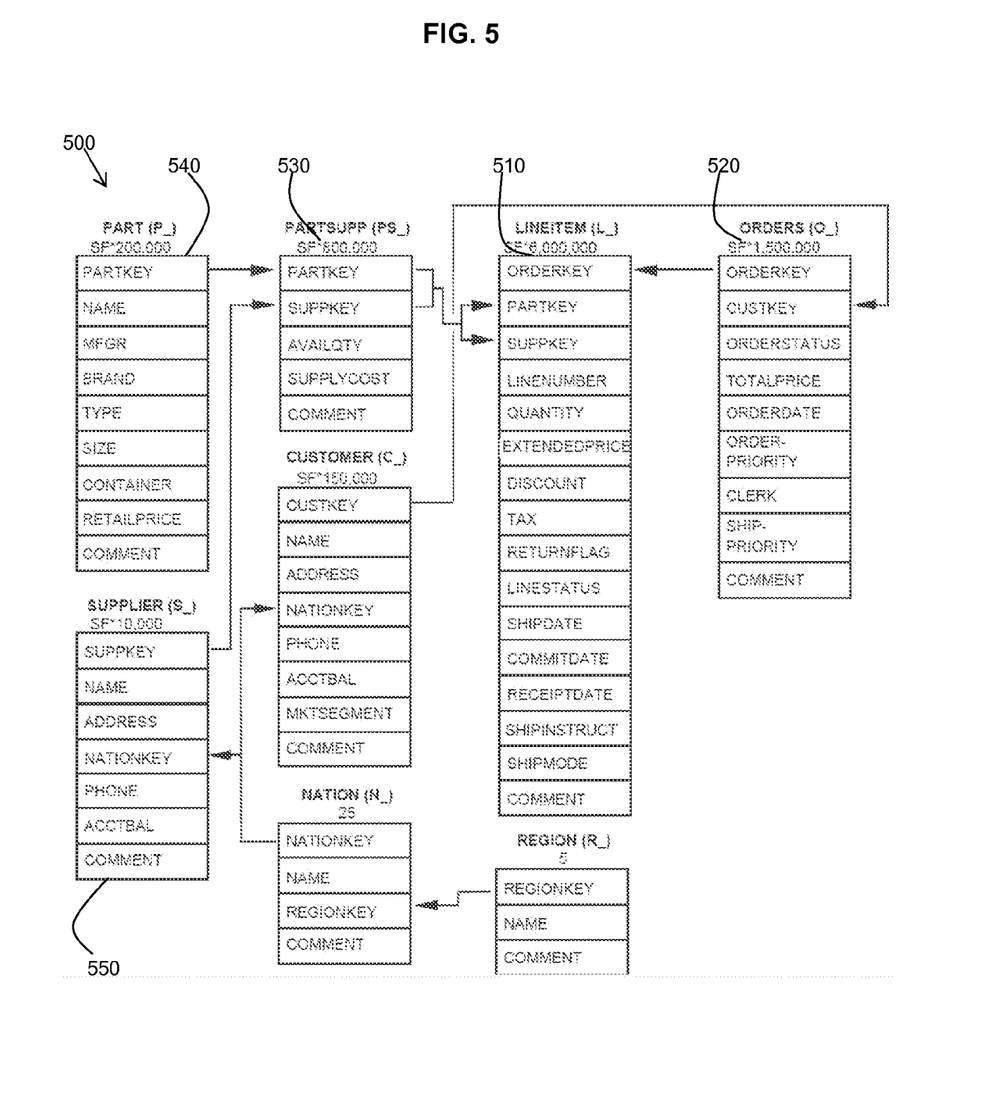
FIG. 5 is a schematic diagram of an example schema which may be used in accordance with an exemplary embodiment of the present invention.

Referring to FIG. 5, an example well known schema 500 is shown in the environment of data warehousing.

The lineitem table 510 comprises several parents but no child relationships. It is therefore a Fact table. The orders table 520 and partsupp table 530 are dimensions of the lineitem table 510. This schema is in essence a snow-flake and the part table 540 and supplier table 550 are in turn dimensions of the partsupp table 530. In this way, the schema 500 can be traversed through the foreign key constraints to identify tables as fact or dimensions.

Figure 6:
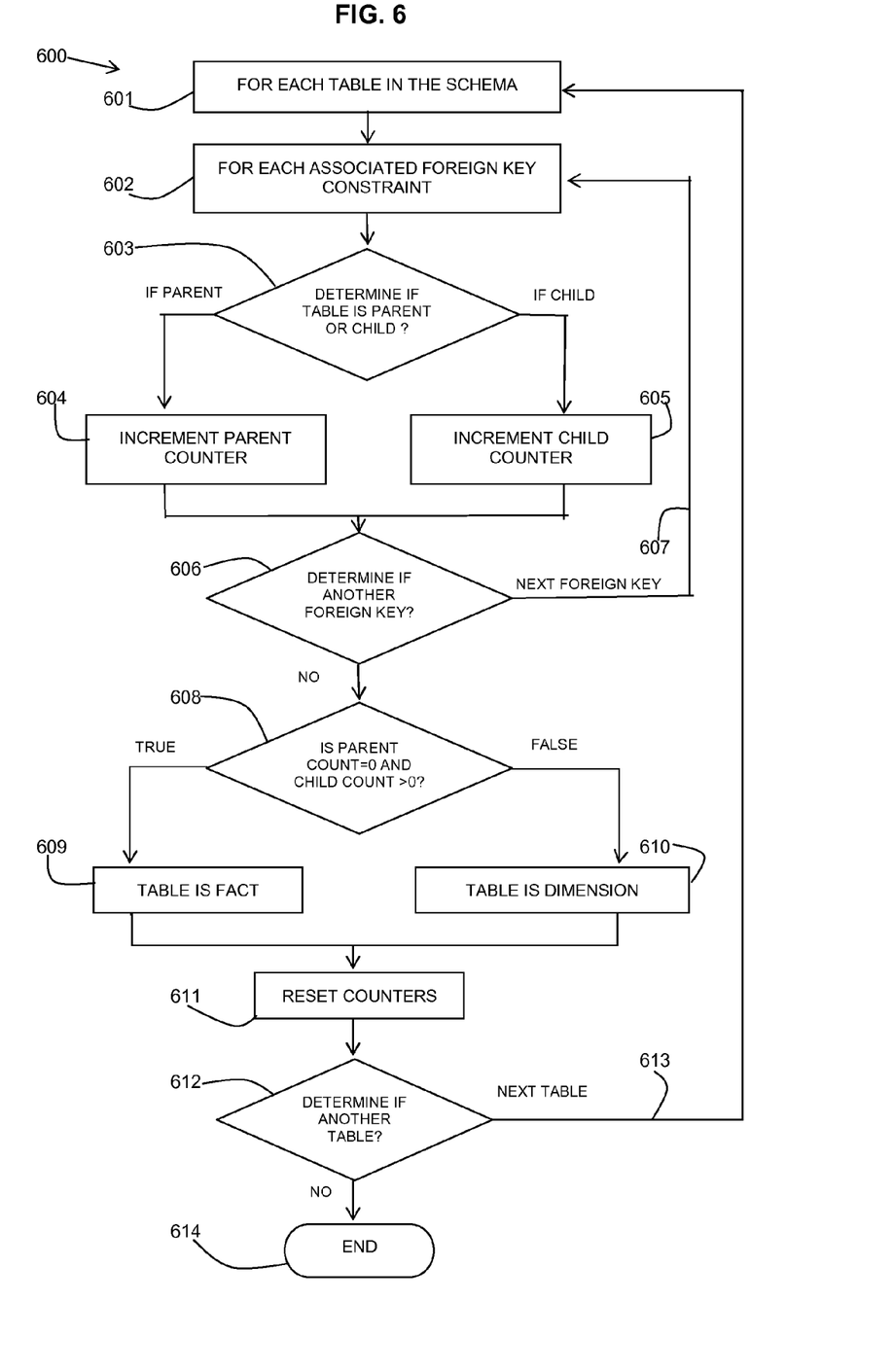
FIG. 6 is a flow diagram of an embodiment of an aspect of a method in accordance with an exemplary embodiment of the present invention.

Referring to FIG. 6, an embodiment of a method of traversing the schema to identify fact tables and dimensions is shown in a flow diagram 600.

For each table in the schema in block 601 and for each associated foreign key constraint in block 602, it is determined in block 603 if the table is a parent or child. If the table is a parent, a parent counter is incremented in block 604. If the table is a child, a child counter is incremented in block 605. It is then determined in block 606 if there is another foreign key. If so, the method loops in block 607 to the next foreign key constraint in block 602. If not, it is determined in block 608 if the parent count=0 and the child count>0. If this is true, the table is a fact in block 609. If this is false, the table is a dimension in block 610. In both cases, the counters are reset in block 611. It is then determined 612 if there is another table. If so, the method loops in block 613 for the next table back to step in block 601. If not, the method ends in block 614.

Using Template to Generate Hypothetical Workload

In the data warehousing environment, once the fact and associated dimension tables have been identified, a hypothetical ROLAP workload can be generated from the foreign key relationships. An example high level query template is as follows:

```
SELECT      D.p1, D.p2,...,D.pn,
            AGG(F.m1), AGG(F.m2),..., AGG(F.mn)
FROM        F
/**Join predicates **/
INNER|LEFT OUTER|RIGHT OUTER JOIN D1 ON F.d1 = D1.h1
INNER|LEFT OUTER|RIGHT OUTER JOIN D2 ON F.d2 = D2.h1
INNER|LEFT OUTER|RIGHT OUTER JOIN Dn ON F.dn = Dn.h1
WHERE
    /** Local predicates on Dimensions **/
            PRED(D1) AND
            PRED(D2) AND
            PRED(Dn) AND
    /** Restrictions to measures **/
            PRED({F.m})
GROUP BY    D.p1, D.p2,...,D.pn
HAVING      PRED( {AGG(F.mn)})
ORDER BY    <ordering fields>
notes: F = Fact table,
    D.pn = dimension nth property,
    F.mn = Fact table nth measure,
    F.dn = Fact table nth dimension,
    Dn.hn = nth hierarchy on nth Dimension
    AGG = Aggregate Functions e.g. SUM, MAX, MIN, AVG, COUNT.
```

Using the query template, various combinations of selection, roll-up, drill-down, projection and union queries can be built.

The template may also be used for non-data warehouse systems by using a child table from a relationship as the fact, and parent tables from relationships with that child table as the dimensions.

The identified fact and its associated dimension tables can be substituted for the parameter marker in the FROM clause. In the example below, F is lineitem and D1 is orders.

The join conditions can be completed from the foreign key definition, thus F.dl1_orderkey and D1.h1o_orderkey. Local equality, range or LIKE predicates can be randomly included on dimension properties. These local predicates on dimensions properties can be for properties included in the SELECT clause (filters) or that are not included in the SELECT (slicers). Likewise, local predicates can be included on the Fact table measures. In the example, (D1) is a filter based on order date "o_orderdate>=date ('2000-01-01')" and PRED(F) is a filter based on the fact measure "l_tax>0". Where literal expressions are used, these are set to random values appropriate to the data-type of the column. For example, literal expressions for date columns should be valid dates cast using the date function (per our example). Likewise, expressions for char/varchar columns should include single quotation marks. Range based predicates are applicable to numeric and date but not to char/varchar. Similarly, LIKE predicates are applicable to char/varchar only.

The parameter markers in the SELECT clause are substituted with a random selection of properties (non-key columns) from the dimension tables used in the FROM clause, along with a random selection of aggregated measures (numeric values) from the fact table. In the example, orderstatus is selected from the Orders table and sum of quantity and the maximum extended price from the LineItem table.

The parameter markers in the GROUP BY clause will be the same as the randomly selected dimension table properties in the SELECT clause. GROUP BY clauses are optional depending on whether the query is intended as a rollup or non-aggregated selection/projection. However, GROUP BY should be used if all the dimensions tables associated with the Fact table are not specified in the SELECT statement, i.e. roll-up queries are typically used to exclude one or more dimensions. One or more of the dimension properties added to the GROUP BY clause can be included in the ORDER BY.

The following is the simple hypothetical query constructed in this example:

```
SELECT o_orderstatus, sum(l_quantity),max(l_extendedprice)
FROM lineitem
INNER JON orders ON o_orderkey = l_orderkey
WHERE o_orderdate >= date ('2000-01-01')
AND l_tax > 0
GROUP BY o_orderstatus
ORDER BY o_orderstatus;
```

In a snow-flake schema, queries can span more than a single star cluster, e.g. to include tables joined through common (conformed) dimensions. In the diagram of FIG. 5, Supplier can be joined to lineitem via the partsupp table and similarly customer can be joined to lineitem through the orders table.

A greater diversity of queries can be achieved by including a set of granular templates each including a specific combination of ROLAP construct (roll-up, drill-down, etc.), nested groupings, SQL functions (e.g. date, rank, etc.), CASE statements, common table expressions (WITH clause) and so on. In a more sophisticated embodiment, these templates could also be edited by the designer to influence the quality of the hypothetical workload generated.

Figure 7:
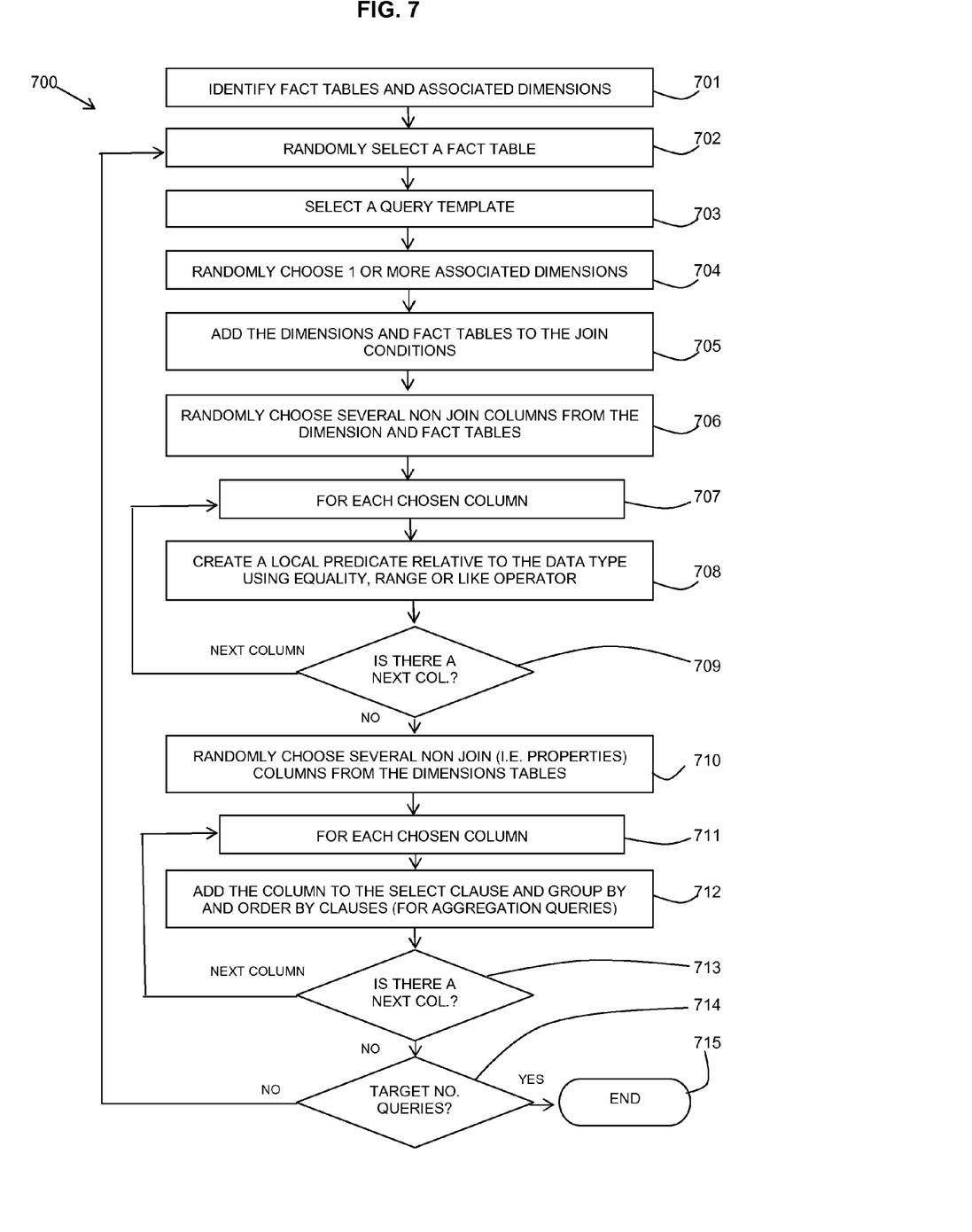
FIG. 7 is a flow diagram of an embodiment of an aspect of a method in accordance with an exemplary embodiment of the present invention.

Referring to FIG. 7, a flow diagram 700 shows an embodiment of a method for deriving the hypothetical workload from a data warehouse system.

Fact tables and associated dimensions are identified in block 701 and a fact table is randomly selected in block 702. A query template is selected in block 703. One or more associated dimensions are randomly chosen in block 704 and the dimensions and fact tables are added to the join conditions in block 705.

Several non-join columns are randomly chosen in block 706 from the dimension and fact tables. For each chosen column in block 707, a local predicate is created in block 708 relative to the data type using equality, range or like operator. It is determined in block 709 if there is another column. If so, the method loops to the next column to step in block 707.

If there is not a next column, several non-join (i.e. properties) columns are randomly chosen in block 710 from the dimensions tables. For each chosen column in block 711, the column is added in block 712 to the SELECT clause, and GROUPED BY and ORDER BY clauses (for aggregation queries). It is then determined in block 713 if there is a next column. If so, the method loops to the next column to step in block 711.

If not, it is determined in block 714 if a target number of queries have been reached. If so, the method ends in block 715. If not, the method loops to step in block 702 to select a fact table.

Figure 8:
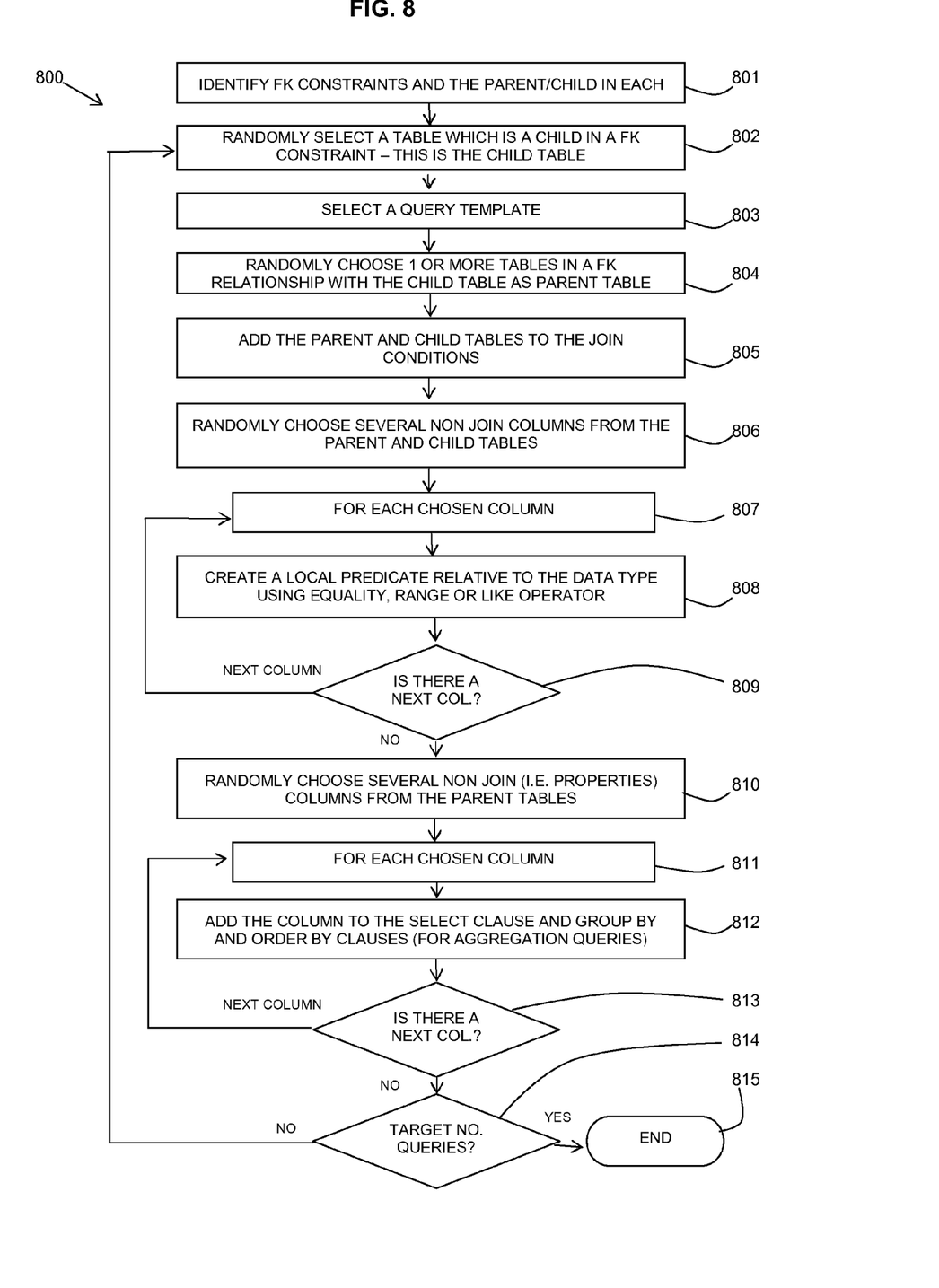
FIG. 8 is a flow diagram of another embodiment of an aspect of a method in accordance with an exemplary embodiment of the present invention.

Referring to FIG. 8, a flow diagram 800 shows an embodiment of a method for deriving the hypothetical workload from a general (non-data warehouse) system.

Foreign key constraints and associated parent/child relationships are identified in block 801 and a child table is randomly selected from one of these relationships in block 802. A query template is selected in block 803. One or more associated parent tables are randomly chosen in block 804 and the parent and child tables are added to the join conditions in block 805.

Several non-join columns are randomly chosen in block 806 from the parent and child tables. For each chosen column in block 807, a local predicate is created in block 808 relative to the data type using equality, range or like operator. It is determined in block 809 if there is another column. If so, the method loops to the next column to step in block 807.

If there is not a next column, several non-join (i.e. properties) columns are randomly chosen 810 from the parent tables. For each chosen column in block 811, the column is added in block 812 to the SELECT clause, and GROUPED BY and ORDER BY clauses (for aggregation queries). It is then determined in block 813 if there is a next column. If so, the method loops to the next column to step in block 811.

If not, it is determined in block 814 if a target number of queries have been reached. If so, the method ends in block 815. If not, the method loops to step in block 802 to select a child table.

Provide Facility for Database Designer to Input Table and Column Cardinality

Figure 9:
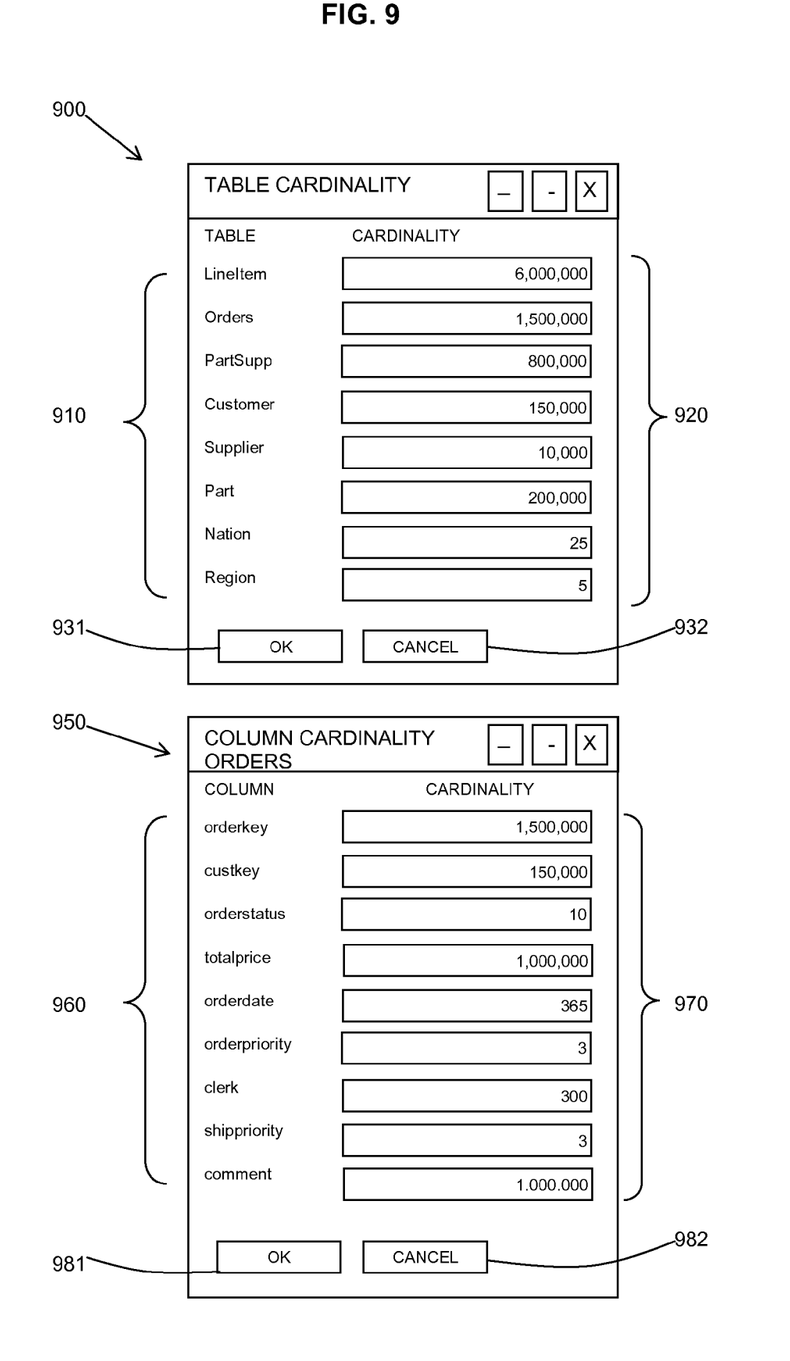
FIG. 9 is a schematic diagram of embodiments of graphical user interfaces in accordance with an exemplary embodiment of the present invention.

Referring to FIG. 9, example GUI windows 900, 950 are shown for the designer to supply cardinality for each table and associated columns in the performance modelling tool.

The window 900 for the table cardinality information includes a list of tables 910 and for each table a corresponding input box 920 for the cardinality figure. Once the figures have been input by the designer, the data can be confirmed by selecting and "OK" button 931 or cancelled by selecting a "cancel" button 932.

Similarly, the window 950 for the column cardinality lists columns 960 and for each column a corresponding input box 970 is provided for the cardinality figure. Once the figures have been input by the designer, the data can be confirmed by selecting and "OK" button 981 or cancelled by selecting a "cancel" button 982.

Calculate Required Optimizer Statistics From Cardinality Information Supplied.

There are 11 optimizer statistics that can be set in the DB2 system catalogue to accurately simulate a hypothetical dataset. The value for all 11 statistics may be derived from the table and column cardinality as supplied by the designer using a combination of mathematical and heuristic rules. Example rules for deriving these 11 statistics are described in the following table:

| STATISTIC | DESCRIPTION | FORMULA |
|---|---|---|
| SYSCAT.TABLES - Table Statistics | | |
| CARD | Total number of rows in the table | provided by designer/user |
| FPAGES | Total number of pages | CARD * (AvgRowSize)/PageSize, where AvgRowSize = Sum(AvgColumnSize) + 10 - refer note 1 below. |
| NPAGES | Total number of pages on which the rows of the table exist | Assigned the same values as per FPAGES - as this value assumes no fragmentation on the table. |
| SYSCAT.COLUMNS - Column Statistics | | |
| COLCARD | Number of distinct values in the column | As provided by the designer/user. |
| LOW2KEY | Second-lowest data value. | For NUMERIC columns the value 1 will be assigned. For CHAR/VARCHAR columns, the value 'B' will be assigned. For DATE/TIMESTAMP, the Designer will be prompted to supply a lower threshold value for all dates. The LOW2KEY value will be set to the lower threshold + 1 day. |
| HIGH2KEY | Second-highest data value. | For NUMERIC columns this will be set to the value of LOW2KEY plus the column cardinality minus 3 i.e. LOW2KEY + COLCARD - 3. For CHAR/VARCHAR columns a string in the form of 'Y...' padded to the length of the column. For DATE the value is set to LOW2KEY + COLCARD days -3 |

-continued

| STATISTIC | DESCRIPTION | FORMULA |
|---|---|---|
| SYSCAT.INDEXES - Index Statistics | | |
| NLEAF | Number of leaf pages | CEILING(number of table rows/entries per page) Refer Note 2 below |
| NLEVELS | Number of index levels | The number of level is the number of levels having >0 pages per the following calculation: CEILING(pages in previous level/minimum child pages) Refer Note 3 below. |
| CLUSTERRATIO | Degree of data clustering with the index | An assumption is made that the table data is clustered by the primary key unique index. Thus, a value of 100 will be assigned for PK/unique indexes. Any other index whose first constituent column is the same as the first column in the PK index will also be assigned a cluster ratio of 100. All remaining indexes will be assigned a cluster ratio of 5 on the basis that the data is not likely to be very clustered. |
| SEQUENTIAL_PAGES | Number of leaf pages located on disk in index key order with few or no large gaps between them | Assigned the same value as NLEAF as assumed that no fragmentation on the index in the initial stage |
| DENSITY | Ratio of SEQUENTIAL_PAGES to number of pages in the range of pages occupied by the index, expressed as a percent (integer between 0 and 100) | A density of 100% is assumed for all indexes on the basis that index housekeeping (REORG) will be proactive. |

Notes:
1) The average column size (AvgColumnSize) is set to the datatype length for integer, date and char columns as these are fixed length datatypes. For decimal columns the average column size is set to half the column length. For variable character (varchar) columns the average column size is set to a percentage of the maximum column length as supplied by the designer.
2) Entries per page is calculated as FLOOR(usable space per page/space per key), where: ii. usable space per page is FLOOR(0.9 * PageSize) {assumes 90% of page is used}; and iii. space per key is (4 + (sum of length of columns in the index + (average number of data records per distinct key value * Record ID length (4) + 1).
3) The number of level is the number of levels having >0 pages. The minimum child pages is the greater of 2 or (entries per page (per note 2) + 1). For level 2, the pages in previous level is NLEAF, for level 3, the pages in previous level is result of the calculation for level 2 and so on, until the pages in previous level = 0.

The estimated cost returned by explain plan for these hypothetical optimizer statistics matches closely with the estimated cost returned for real optimizer statistics populated with an equivalent amount of real-data.

Run Workload with db2expln or EXPLAIN PLAN

Having set the hypothetical optimizer statistics for all tables in the workload, the hypothetical workload may now be submitted to db2expln or EXPLAIN PLAN to calculate the cost for each statement. The cost for all statements may then be summed to produce an overall baseline cost for the current data model design. This may be presented to the designer.

Because EXPLAIN PLAN or db2expln is quick to execute, it is possible for the database designer to adjust the physical attributes of the model, and/or the workload and behind the scenes the local test database can then be updated accordingly and the workload re-run with EXPLAIN PLAN, within a brief period of time. This facility allows the designer to interactively adjust the model and determine the positive or negative impact of changes in estimated cost. For instance, the designer could include an additional index and resubmit the workload to the optimizer to determine if index has positive (reduced overall cost) or negative impact (increased overall cost).

The solution proposed offers several advantages over the prior art summarised above. It offers the ability to evaluate the performance of a greenfield database, i.e. one without database statistics. Additionally, it also allows a convenient implementation within a typical data-modelling tool so that physical design decisions can be made up front at initial database design stage, rather than after the event of database creation, when changes become more involved (affecting development of dependent ETL-extract, transform and load, ROLAP applications etc.).

This solution ties schema optimization with the physical implementation.

The described method and system rapidly quantify the performance characteristics of the physical data model at the initial design stage by leveraging the database management system's own cost-based-optimizer (added advantage of being vendor agnostic) without the necessity to populate data or indeed to have a predefined SQL workload.

The described method and system does not require an existing source database complete with statistics, nor an existing source workload. It creates a hypothetical workload and statistics using minimal information provided by the designer, which facilitates the design of a brand new data warehouse (which by definition does not have an existing source database).

Ideally, the described facility should be portable and applicable to the various commercial DBMS products. The method will ideally not require the target database infrastructure (which may not yet be in place) and will be possible to run and produce accurate results from the designer's laptop/desktop via a simple GUI.

A performance analysis system for a new data warehouse may be provided as a service to a customer over a network.

The invention can take the form of an entirely hardware embodiment, an entirely software embodiment or an embodiment containing both hardware and software elements. In a exemplary embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for performance analysis of a database, comprising:
   receiving, at a processor, a proposed data model;
   generating a hypothetical query workload, the generating comprising using a plurality of sample query templates representing different query constructs for the proposed data model, identifying fact tables and dimension tables using foreign key constraints between tables in the proposed data model, substituting join predicates based on the foreign key constraints, randomly selecting dimension properties and fact measures from table definitions, randomly selecting local predicates from the dimension tables for slice and filter conditions, and randomly substituting literal values based on a datatype of an associated dimension column;
   generating hypothetical optimizer statistics using predefined generating rules that include a projected cardinality for the proposed data model;
   creating a sample unpopulated database and database schema using the proposed data model;
   applying, by the processor, the hypothetical optimizer statistics to the sample unpopulated database;
   based on generating the hypothetical optimizer statistics, applying, by the processor, each query construct of the hypothetical query workload to the database schema; and
   estimating, by the processor, a cost of the hypothetical query workload for the proposed data model.

2. A method as claimed in claim 1, further comprising refining the proposed data model and iterating estimating the cost of the hypothetical query workload.

3. A method as claimed in claim 1, further comprising receiving cardinality information for each table and its associated columns for the database and using the cardinality information to generate the hypothetical optimizer statistics.

4. A method as claimed in claim 1, further comprising refining the cardinality information for the database and iterating estimating the cost of the hypothetical query workload.

5. A method as claimed in claim 1, wherein generating hypothetical optimizer statistics and applying these to the sample unpopulated database, further comprises: applying calculated table, column and index cardinalities by updating relevant optimizer statistics values in the database catalog.

6. A method as claimed in claim 1, wherein generating a hypothetical query workload further comprises identifying child and parent tables using the foreign key constraints between tables in the proposed data model.

7. A method as claimed in claim 1, wherein the database is a data warehouse and the database schema is a star schema with the fact table and the dimension table.

8. A method as claimed in claim 1, wherein estimating the cost of the hypothetical query workload for the proposed data model further comprises:
   executing each query from the hypothetical query workload against the database using an explain plan command to compute an access path used to execute the query to provide an estimate cost of each query.

9. A method as claimed in claim 8, further comprising summing the cost of all workload queries to represent a base line cost.

10. A system for performance analysis of a database, comprising:
    a processor;
    a component for receiving a proposed data model;
    a hypothetical workload generator component for generating a hypothetical query workload, the generating comprising using a plurality of sample query templates representing different query constructs for the proposed data model, identifying fact tables and dimension tables using foreign key constraints between tables in the proposed data model, substituting join predicates based on the foreign key constraints, randomly selecting dimension properties and fact measures from table definitions, randomly selecting local predicates from the dimension tables for slice and filter conditions, and randomly substituting literal values based on a datatype of an associated dimension column;
    a hypothetical optimizer statistics component for generating hypothetical optimizer statistics using predefined generating rules that include a projected cardinality for the proposed data model;
    a database and schema creation component for creating a sample unpopulated database and database schema using the proposed data model;
    a database catalogue updater component for applying the optimizer statistics to the sample unpopulated database;
    an applying component for, once hypothetical optimizer statistics are set, applying each query construct of the hypothetical query workload to the database schema based on the hypothetical optimizer statistics being generated; and
    a cost generating component for estimating a cost of the hypothetical query workload for the proposed data model.

11. A system as claimed in claim 10, further comprising:
    a refinement input receiver and iteration component for refining the proposed data model and iterating estimating the cost of the hypothetical query workload.

12. A system as claimed in claim 10, further comprising:
    a user cardinality input receiving component for receiving cardinality information for each table and its associated columns for the database and using the cardinality information to generate the hypothetical optimizer statistics.

13. A system as claimed in claim 10, wherein the user cardinality input receiving component includes receiving refined cardinality information for the database and iterating estimating the cost of the hypothetical query workload.

14. A system as claimed in any one of claim 10, wherein the database catalog updater component is configured for applying calculated table, column and index cardinalities by updating relevant optimizer statistics values in the database catalog.

15. A system as claimed in any one of claim 10, further comprising a child and parent identifying component for identifying child and parent tables using the foreign key constraints between tables in the proposed data model.

16. A system as claimed in claim 10, wherein the database is a data warehouse and the database schema is a star schema with the fact table and the dimension table.

17. A system as claimed in claim 10, wherein:
   the cost generating component is for executing each query from the hypothetical query workload against the database using an explain plan command to compute an access path used to execute the query to provide an estimate cost of each query.

18. A computer program product for performance analysis of a database, the computer program product comprising a non-transitory computer readable storage medium having computer-readable program code embodied therewith, the computer-readable program code configured to:
   receive a proposed data model;
   generate a hypothetical query workload, the generating comprising using a plurality of sample query templates representing different query constructs for the proposed data model, identifying fact tables and dimension tables using foreign key constraints between tables in the proposed data model, substituting join predicates based on the foreign key constraints, randomly selecting dimension properties and fact measures from table definitions, randomly selecting local predicates from the dimension tables for slice and filter conditions, and randomly substituting literal values based on a datatype of an associated dimension column;
   generate hypothetical optimizer statistics using predefined generating rules that include a projected cardinality for the proposed data model supplied by a designer;
   create a sample unpopulated database and database schema using the proposed data model;
   apply the hypothetical optimizer statistics to the sample unpopulated database;
   once hypothetical optimizer statistics are set, apply each query construct of the hypothetical query workload to the database schema; and
   estimate a cost of the hypothetical query workload for the proposed data model.

* * * * *